United States Patent [19]

Bürge et al.

[11] Patent Number: 5,100,984
[45] Date of Patent: Mar. 31, 1992

[54] WATER-SOLUBLE COPOLYMERS, A PROCESS FOR THEIR PREPARATION AND THEIR USE AS FLUIDIZERS IN SUSPENSIONS OF SOLID MATTER

[75] Inventors: Theodor A. Bürge, Geroldswil; Jürg Widmer; Irene Schober, both of Zürich; Ueli Sulser, Oberengstringen, all of Switzerland

[73] Assignee: Sika AG vorm. Kaspar Winkler & Co., Zurich, Switzerland

[21] Appl. No.: 523,898

[22] Filed: May 16, 1990

[30] Foreign Application Priority Data

May 17, 1989 [CH] Switzerland .................. 1846/89

[51] Int. Cl.$^5$ .......................................... C08F 230/04
[52] U.S. Cl. .................................. 526/240; 526/264; 526/304; 526/307.1; 524/808
[58] Field of Search ............ 526/240, 304, 307.1; 524/808, 813, 547; 525/326.9, 328.4

[56] References Cited

U.S. PATENT DOCUMENTS 4,301,266 11/1981 Muenster ............... 526/212
4,725,655 2/1988 Denzinger .............. 526/65

OTHER PUBLICATIONS

S. G. Chubinskaya et al., Khim Farm Zh 24(2) 1990, pp. 121–123 (PTO translation).
Chem. Abstr. 112: 210615m (1990).

Primary Examiner—Joseph L. Schofer
Assistant Examiner—M. Nagumo
Attorney, Agent, or Firm—Burns, Doane, Swecker & Mathis

[57] ABSTRACT

Novel water-soluble linear copolymers of N-vinylamides with monomeric addition products of amines, amino acids, amino groups containing aromatic sulfonic acids, amino alcohols of maleic anhydride as well as maleic esters of polyoxyalkyleneglycols or their monoethers. There is also described the process for the preparation of these copolymers. The copolymers are useful as fluidizers in water containing solid matter suspensions.

33 Claims, No Drawings

WATER-SOLUBLE COPOLYMERS, A PROCESS FOR THEIR PREPARATION AND THEIR USE AS FLUIDIZERS IN SUSPENSIONS OF SOLID MATTER

BACKGROUND OF THE INVENTION

The invention relates to water-soluble copolymers, a process for their preparation, and their use as fluidizers in suspensions of solid matter.

More specifically, the invention relates to novel water-soluble copolymers of N-vinylamides with monomeric addition products of amines, amino acids, amino groups containing aromatic sulfonic acids, amino alcohols to maleic anhydride as well as maleic esters of polyoxyalkyleneglycols or their monoethers. Preferred copolymers include those which are obtained by radical copolymerization of N-vinyllactams with the above mentioned maleic acid adducts at a molar ratio of 1:1.

Fluidizers have been commonly used in conjunction with solid matter suspensions, and building or construction materials such as cement and cement mortar. Freshly prepared concrete, for example, is generally considered to be a mixture containing cement, mixing water and the additives sand and gravel of distinct particle size distribution. In contrast to concrete, a cement mortar contains no coarse additives (e.g., gravel), but often has a higher cement content.

After mixing, concrete passes several stages of development; i.e., from freshly prepared concrete to solid concrete. These stages may be partly influenced by particular additives.

Concrete additives are added to freshly prepared concrete and freshly prepared mortar and generally dissolved in the mixing water, in order to influence the workability and final characteristics thereof. Depending on the purpose of a building or of a construction part, as well as any other specific requirements, the characteristics of the concrete will have to be defined by the engineer. The most important characteristic with freshly prepared concrete are the workability, the inner cohesion and its consistency. In the case of solid concrete, the tensile and compressive strengths, resistance to frost, resistance to dew salt, waterproofness, resistance to abrasion and chemical durability are important.

All these characteristics are dependent on the water cement value (water cement factor). The water cement value (w):

$$w = W/Z;$$

is obtained from the quantitative ratio of water (W) to cement (Z) in freshly mixed concrete. With increasing water content the water cement value rises, and with increasing cement content it becomes smaller. A low water cement value affords better characteristics of the solid concrete and solid mortar.

On the other hand, a higher water cement value provides better workability of freshly prepared concrete. The transfer of freshly prepared concrete from a concrete mixer into the (concrete) form, and the subsequent solidification in the (concrete) form requires a considerable consumption of work and control of work. Therefore, a considerable difference in cost has arisen depending on the workability of a particular batch.

In order to reduce expenditures on work and cost, concrete mixtures have been made more liquid by adding more mixing water (which increases the water cement value). Unfortunately, this has always resulted in reduced strength for the hardened concrete. In recent years so-called fluidizers (also frequently referred to as super plasticizers or heavy duty plasticizers) have been increasingly used which allow for an improvement in the consistency of a concrete mixture at a constant water cement value.

Water reducing agents based on polycondensates such as the sodium or calcium salts of sulfonated naphthalene formaldehyde condensates described in U.S. Pat. No. 3,537,869, or salts of sulfonated melamine formaldehyde condensates such as those described in DE-PS 1 671 017, have been used as super plasticizers in order to improve the workability and the time-dependent flow behavior of cement mortars and concrete. These water reducing agents can improve the flowability of such mixtures, but this flowability may not be maintained according to normal practice for a sufficiently long period of time. As a result, additional amounts of water reducing agents have to be added at certain intervals.

Copolymers based on acrylic acid which show a stronger influence on flowability have been tried as super plasticizers. Unfortunately, these compounds have the drawback of significantly retarding development strength when added in the usual dosages to mortar or concrete. They have yet to be established on the market.

Water reducing agents have also been used in the production of gypsum building materials such as gypsum board. Gypsum is the generic name for the mineral (hydrous calcium sulfate, $CaSO_4.2H_2O$) variously known as selenite, satin spar, alabaster, rock gypsum, gypsite, etc., and is commonly used to make a form of plaster.

In the production of gypsum sheet materials (e.g., gypsum board which is a gypsum plaster board covered with paper), sheet products are normally fabricated on a high-speed machine that automatically spreads a foamy plaster core between sheets of tough surface papers, and cuts the resultant board to proper dimensions. In the past, water reducing agents have been added to plaster solutions to ease processing. These agents have commonly been formaldehyde-based water reducing agents.

Formaldehyde, unfortunately, is toxic (e.g., by inhalation) and its handling and containment constitutes a tremendous practical problem during the production of gypsum materials. For example, formaldehyde is released to the air when gypsum board is dried.

It is generally known that N-vinyllactams such as 1-ethenyl-2-pyrrolidinon, may be copolymerized in solution with a large number of olefinic group containing monomers. Many of these products may be used as water-soluble polymeric dispersing agents. For example, U.S. Pat. No. 3,116,254 describes a copolymer with maleic anhydride and its alkali metal salts obtained by hydrolysis, and its use as a fluidizers for hydraulic cement compositions.

DE-OS 35 29 095 describes preparing copolymers with acrylic acid which are used as auxiliary products for building materials, especially as additives for flow mortars.

GB-PS 2 202 526 describes ternary copolymers with acrylamide and Na-2-acrylamido-2-methylpropanesulfonate. European Patent Application No. 0,116,671 describes copolymers of vinyl- and allyl sulfonic acids.

SUMMARY OF THE INVENTION

Accordingly, it is a general object of the present invention to provide new water-soluble linear copolymers, and to provide a process for the preparation of the copolymers. It is also an object to provide new dispersing agents for solid matter in water containing compositions, as well as new water reducing agents useful in building or construction materials such as concretes and mortars, and other contexts such as in the manufacture of gypsum board materials.

It is a further object of the invention to provide a water reducing agent which can be used in smaller dosages than conventional water reducing agents. The ability to use smaller dosages can help avoid significant problems such as retardation of development strength in building or construction materials.

It is even a further object of the invention to provide a water reducing agent which can give longer workability times than conventional water reducing agents. This can alleviate common problems with handling, and the problems associated with the common practice of adding additional water reducing agents such as additional labor and its associated cost, as well as the cost of the additional agents themselves.

From a safety standpoint, it is also an object of the invention to provide a water reducing agent which can be effectively used in the production of gypsum based materials yet does not contain formaldehyde.

Thus, the subject matter of the invention relates generally to a fluidizer for suspensions of solid matter which is a water-soluble linear copolymer built up of at least two types of partial structure units. One structural unit is represented by Formula (A) or by Formula (B); the other partial structure unit being represented by Formula (C):

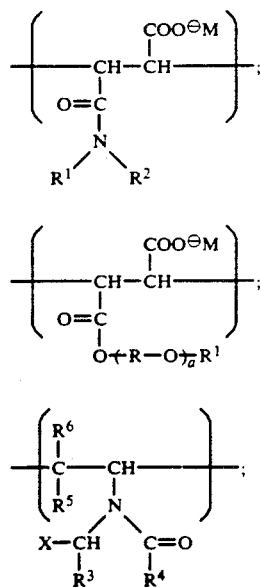

wherein $R^1$ and $R^2$, which may be the same or different, each represent hydrogen, a $C_1$- to $C_{20}$-alkyl residue which may optionally include alkali metal carboxylate or alkaline earth metal carboxylate groups, an aromatic group, an aliphatic or cycloaliphatic residue which may optionally include sulfonic acid groups or alkali metal sulfonate or alkaline earth metal sulfonate groups, a hydroxyalkyl group, preferably a hydroxy ethyl- or hydroxypropyl group, or may together with the nitrogen atom to which they are bound, form a morpholine ring;

M represents a hydrogen ion, a monovalent or divalent metal ion or a substituted ammonium group;

R represents an alkylene group having 2 to 4 carbon atoms;

R' represents a hydrogen atom or an alkyl group having 1 to 4 carbon atoms;

p, q, and r are integers;

a represents an integer ranging from 1 to 100;

$R^3$ and $R^4$ which may be the same or different, each represent hydrogen, a $C_1$ to $C_{12}$-alkyl residue, a phenyl residue, or may together form a di-, tri-, or tetramethylene group, which form with the inclusion of the residue of the formula:

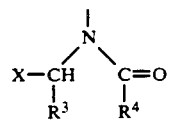

a five, six or seven membered ring;

$R^5$ and $R^6$ which may be the same or different, each represent hydrogen, a Cl to C12-alkyl residue or a phenyl residue; and X represents hydrogen, a $C_1$- to $C_4$-alkyl residue, a carboxylic acid group or an alkali metal carboxylate group.

While the invention will be described below in connection with certain preferred embodiments thereof, it will be understood that it is not intended to be limited to those embodiments. To the contrary, it is intended to cover all alternatives, modifications, and equivalents as may be included within the spirit and scope of the invention as defined by the appended claims.

DETAILED DESCRIPTION OF THE PREFERRED EMBODIMENTS

As noted above the copolymers of the invention are useful as dispersing agents. They may be used as dispersing agents in aqueous suspensions of, for example, clays, porcelain muds, chalk, talcum, carbon black, stone powders, piqments, silicates and hydraulic binders.

Also, the copolymers are useful as fluidizers or super fluidizers (heavy duty fluidizers) for water containing building or construction materials, containing inorganic hydraulic binders such as Portland cement, alum earth cement, blast furnace cement, puzzolan cement or magnesia cement, and additives such as sand, gravel, stone powder, fly ash, vermiculite, expanded glass, expanded clays, chamotte, light weight additives and inorganic fibers and synthetic fibers. Optionally, the materials can also contain at least one component selected from the group of air entraining agents, concrete plasticizers, heavy duty or super plasticizers for concrete, mortar plasticizers, setting accelerating agents and setting retarding agents. In this context, the invention can provide such high and surprisingly long lasting effects on flowability, that they may be used effectively in low concentrations thereby avoiding the retardation effects in setting.

It was also quite surprisingly found that some of the copolymers of the invention have a distinct affinity for metal ions, especially alkaline earth metal ions (e.g., calcium ions). Thus, the copolymers of the invention may also be used as complexing agents for those ions.

In a preferred embodiment, the dispersants or fluidizers of the invention are used in the form of an aqueous solution. In this embodiment the aqueous solution contains the copolymer in an amount ranging from 0.01 to 60% by weight, preferably from 0.01 to 5% by weight.

The linear, water-soluble copolymers are built up of at least two types of partial structure units. One structural unit is represented by Formula (A) or by Formula (B); the other partial structure unit being represented by Formula (C):

The preferred copolymers are built up of p partial structure units, preferably from 0 to 1000, represented by Formula (A), or q partial structure units, preferably from 0 to 1000, represented by Formula (B), and r partial structure units, preferably 3 to 1000, represented by Formula (C), wherein the sum of both p and q is in the range of $3 \leq p+q \leq r$.

Preferably, p ranges from 3 to 1000; q ranges from 3 to 1000; and r ranges from 3 to 1000. In a preferred embodiment, $q==0$ and $p+r=3$ to 1000, and structure units represented by Formula (A) and an equal number of structure units represented by Formula (C) are bound in an alternating manner to each other, and wherein there are optionally present further structure units represented by Formula (C).

Examples of monomers which can provide structure units represented by Formula (A) include half amides of maleic acid, prepared by the reaction of maleic anhydride with glutamic acid, glycine or proline, or by the reaction of maleic anhydride with sulfanilic acid, amino toluene sulfonic acid, naphthylaminemonosulfonic acid or naphthylaminedisulfonic acid, and the half amides obtained by the reaction of maleic anhydride with morpholine or amino alkanoles.

Preferred examples of monomers represented by Formula (A) are represented by Formula (AI), Formula (AII), and Formula (AIII) below:

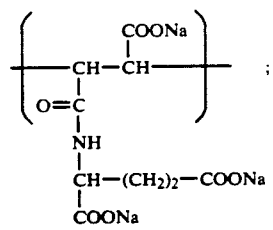

(AI)

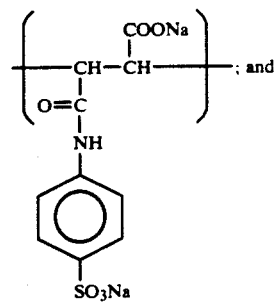

(AII)

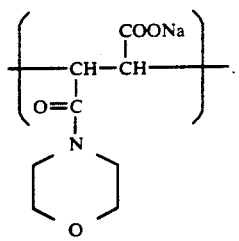

(AIII)

Examples of monomers which can provide structure units represented by Formula (B) include half esters of maleic acid with polyethylene glycols and their monomethyl ethers having a molecular weight ranging from 550 to 5000.

Examples of monomers which can provide structure units represented by Formula (C) include N-methyl-N-vinylacetamide, N-vinyl caprolactam, 1-ethenyl-2-pyrrolidone and 1-ethenyl-2-pyrrolidone-5-carboxylic acid.

Preferred examples of monomers represented by Formula C) are represented by Formula (CI), Formula (CII), and Formula (CIII) below:

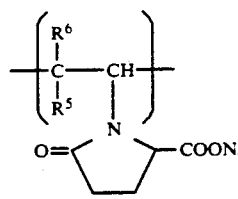

(CI)

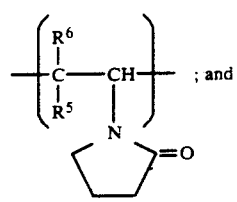

(CII)

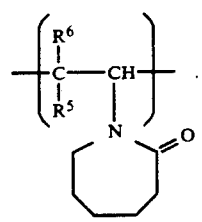

(CIII)

Preferred copolymers are those preferably containing no units of Formula (B), wherein the monomer represented by formula (A) has a structure represented by Formula (AI), the structure units represented by Formula (C) are represented by Formula (CI) or Formula (CII) wherein $R^5$ and $R^6$ which may be the same or different each represent a hydrogen or a methyl group, and wherein $R^1$ is hydrogen and $R^2$ is represented by the formula:

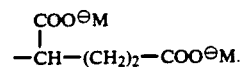

Other preferred copolymers are those preferably containing no units of Formula (B), wherein the monomer represented by Formula (A) has a structure represented by Formula (AII), the structure units represented by Formula (C) are represented by Formula (CI), Formula (CII) or Formula (CIII) wherein $R^5$ and $R^6$ which may be the same or different each represent a hydrogen or a methyl group, and wherein $R^1$ is hydrogen and $R^2$ is represented by the formula:

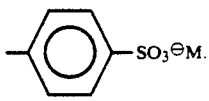

Even other preferred copolymers are those preferably containing no units of Formula (B), wherein the structure units represented by Formula (A) have the structure of Formula (AIII) and the structure units represented by Formula (C) have the structure of Formula (CII), wherein $R^5$ and $R^6$ which may be the same or different each represent a hydrogen or a methyl group.

As noted above, another object of the invention relates to a process for the preparation of the copolymers of the invention. Generally, the process can be characterized by the radical copolymerization of (i) 0 to 60 mol % of a monomer having a structure represented by Formula (1);

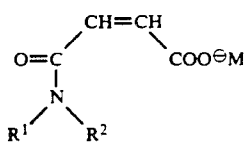 (1)

wherein $R^1$, $R^2$ and M are the same as defined above, or (ii) 0 to 60 mol % of a monomer having a structure represented by Formula (2);

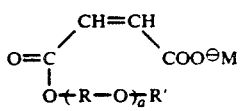 (2)

wherein R, R', M and a are the same as defined above, with (iii) 40 to 60 mol % of a monomer having a structure represented by Formula (3);

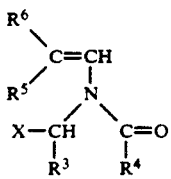 (3)

wherein $R^3$, $R^4$, $R^5$, $R^6$ and X are the same as defined above, and whereby the total of a) to c) must always give 100 mol %.

The reaction is preferably carried out in a solvent, in the presence of at least one polymerization catalyst and at least one chain length controlling agent, and at a temperature of 5° to 100° C, preferably 10° to 75° C. The reaction is preferably carried out at a pH ranging from about 4.5 to about 7.0. The reaction can be carried out in an open atmosphere.

The catalyst is preferably selected from at least one of hydrogen peroxide and sodium peroxide. In one embodiment, the solvent contains at least one of water and an alcohol. The alcohol is preferably isopropanol.

In a preferred embodiment, sodium salts of monomers of general formula (1) are used. In another preferred embodiment 50 mol % of a monomer represented by Formula (1) is reacted with 50 mol % of a monomer represented by Formula (3).

The preferred reaction media are aqueous solutions of the monomers. Initially, it is best to prepare two separate aqueous solutions, each one containing one of the monomers.

The second solution which can contain an N-vinyl lactam and catalysts and controlling agents, preferably ascorbic acid, sodium metabisulfite and iron-2-sulfate, can be dropped into the first solution, which can contain one of the maleic acid adducts and a radical initiator, preferably hydrogen peroxide or sodium peroxide. In general, this mixture should be stirred for 15 to 45 minutes at temperatures from 20° to 75° C. until no peroxide may be detected. It should then be neutralized by the addition of a base. The process is characterized by a high yield, a low concentration of residual monomers and a surprisingly high polymerization rate, despite the fact that the process can be carried out in an open atmosphere without inert gas. It is also possible to work with tap water rather than deionized water.

The following examples illustrate in more detail the present invention. It should be understood, however, that the invention is no limited to the specific details set forth in the examples.

EXAMPLES

Unless otherwise indicated, the copolymers of the invention were synthesized in such a way that a first aqueous solution was prepared containing at least one monomer. To this solution ("Solution 1"), which at times contained one of the maleic acid adducts, $A_1$ to $A_3$ or $B_1$, and a peroxide catalyst, there was dropped a second aqueous solution ("Solution 2"), at times containing one of the N-vinyl lactams, $C_1$ to $C_3$, and certain polymerization modifiers (chain length controlling agents). This mixture was stirred at elevated temperature and at a pH ranging from 4.5 to 7 until no peroxide was detectable.

Table 1 provides a summary in matrix form of the maleic acid adducts $A_1$ to $A_3$ and $B_1$ which were used as monomers in the examples, the comonomer vinyl lactams $C_1$ to $C_3$, and the copolymers prepared therefrom. For example, the matrix element $A_1C_1$ is symbolic of a polymer structure of an alternating radical copolymerizate of monomer $A_1$ with the comonomer $C_1$.

TABLE 1

Copolymers of maleic acid adducts (A or B) and
1-ethenyl lactams (C) according to Examples 1 to 7.

| | $C_1$ (1-ethenyl-2-pyrrolidone-5-carboxylate Na) | $C_2$ (1-ethenyl-2-pyrrolidone) | $C_3$ (1-ethenyl caprolactam) |
|---|---|---|---|
| $A_1$ (maleic acid / glutamic acid adduct, Na salt) | $A_1C_1$ | $A_1C_2$ | |
| $A_2$ (maleic acid / sulfanilic acid adduct, Na salt) | $A_2C_1$ | $A_2C_2$ | $A_2C_3$ |
| $A_3$ (maleic acid / morpholine adduct, Na salt) | | $A_3C_2$ | |
| $B_1$ (maleic acid / methoxy-poly(oxyethylene) adduct, Na salt) | | $B_1C_2$ | |

EXAMPLE 1

In this example, copolymer $A_1C_1$ was prepared in an aqueous solution. A Solution 1 was prepared by adding 1200 g of 10% sodium hydroxide solution and 220 g (1.50 mol) of glutamic acid to a five necked flask equipped with a KPG-stirrer, a reflux condenser, a dropping funnel, a powder funnel and a thermometer. By cooling, the temperature was maintained at 30° C. 142 g (1.45 mol) of maleic anhydride and 116 g of 50% sodium hydroxide solution were then added simultaneously within twenty minutes under stirring. The pH was maintained between 5.50 and 6.90, and by cooling the temperature was maintained in the range of from 30° to 35° C. After the addition was finished the mixture was stirred for 15 minutes, and then 100 g of deionized water, 10 g of 50% sulfuric acid, 25 g of 33% hydrogen peroxide (0.24 mol) and 0.20 g of iron (II) sulfate . 7H$_2$O were added in sequence.

A Solution 2 was prepared in a separate vessel by stirring 370 g of deionized water, 5.6 g of 50% sodium hydroxide solution, 4 g (0.02 mol) of sodium metabisulfite, 4 g (0.02 mol) of ascorbic acid and 248 g (1.40 mol) of sodium-1-ethenyl-2-pyrrolidone-5-carboxylate until a clear solution is formed.

To Solution 1, having a temperature ranging from 18° to 20° C., Solution 2 was dropped within 15 minutes. By cooling, the temperature of the reaction mixture was maintained such that it did not exceed 50° C. After Solution 2 was added, the mixture was stirred for 20 more minutes at 50° C. Then the reaction solution was cooled to 20° C., and checked for peroxide. Any residues which could still be present were neutralized by adding small amounts of sodium metabisulfite.

Finally, the pH was adjusted to a value in the range of from 7 to 8 by adding 50% sodium hydroxide solution. A clear, slightly yellowish solution was obtained having a viscosity of 250 mPa.s (20° C.) and 30% solid matter content.

EXAMPLE 2

In this example, copolymer $A_1C_2$ was prepared in an aqueous solution. A Solution 1 identical to, and prepared in the same manner as, Solution 1 of Example 1 was used.

Solution 2 was prepared by adding 5.6 g of 50% sodium hydroxide solution, 5 g (0.03 mol) of sodium metabisulfite, 3 g (0.02 mol) of ascorbic acid and 150 g (1.35 mol) of 1-ethenyl-2-pyrrolidinon in sequence to 250 g of deionized water. The resulting mixture was stirred until a clear solution was obtained.

Copolymerization was carried out in the same manner as Example 1.

A clear, slightly yellowish solution was obtained having a solid matter content of 30%, a viscosity of 200 mPa.s (20° C.), a pH in the 7 to 8 range, and a residual monomer content of $\leq 5\%$ (HPLC).

EXAMPLE 3

In this example, copolymer $A_2C_1$ was prepared in an aqueous solution. Solution 1 was prepared by adding 576 g of deionized water, 116 g of 50% sodium hydroxide solution (1.45 mol) and 250 g (1.44 mol) of sulfanilic acid to a five necked flask, equipped with a KPG-stirrer, a reflux condenser, a dropping funnel, a powder funnel and a thermometer, under stirring. After cooling to 30° C. and within 30 minutes, 142 g (1.45 mol) of maleic anhydride and 116 g of 50% sodium hydroxide solution were simultaneously added under vigorous stirring in such a way that the pH of the reaction mixture of about 5.5 at the beginning was raised to about 6.7 to 6.9 upon completion. The temperature was thereby maintained in the range of from 30° C. to 35° C. Then, the mixture was stirred for an additional 20 minutes. Afterwards, 450 g of deionized water, 10 g of 50% sulfuric acid, 24 g of 33% hydrogen peroxide and 0.20 g of iron (II)-sulfate . 7H$_2$O were added in sequence.

Solution 2 was prepared in the same manner as, and was identical to, Solution 2 of Example 1.

Copolymerization was carried out by adding, drop by drop, Solution 2 to Solution 1 according to the process described in Example 1.

A clear, brown solution was obtained having a solid matter content of 30%, a viscosity of 220 mPa.s (20° C.), and a pH of 7-8.

EXAMPLE 4

In this example, copolymer $A_2C_2$ was prepared in an aqueous solution. Solution 1 (containing monomer $A_2$) was prepared in the same manner as, and was identical to Solution 1 of Example 3. Solution 2 (containing comonomer $C_2$) was prepared in the same manner as, and was identical to, Solution 2 of Example 2.

Copolymerization was carried out by adding, drop by drop, Solution 2 to Solution 1 according to the process described in Example 1.

A clear, dark brown solution was obtained having a solid matter content of 30%, a viscosity of 200 mPa.s (20° C.), and a pH of 7-8.

EXAMPLE 5

In this example, copolymer $A_2C_3$ was prepared in an aqueous solution. Solution 1 (containing monomer $A_2$) was prepared in the same manner as, and was identical to Solution 1 of Example 3.

Solution 2 (containing comonomer $C_2$) was prepared by adding 5.6 g of 50% sodium hydroxide solution, 5 g (0.03 mol) of sodium metabisulfite, 3 g (0.02 mol) of ascorbic acid and 202 g (1.45 mol) of 1-ethenylcaprolactam in sequence to a mixture of 250 g of deionized water and 250 g of isopropanol. Then, the mixture was stirred until a clear solution was formed.

To effect copolymerization, Solution 2 was added, drop by drop, for 15 minutes, to Solution 1 (having an initial temperature of 20° C.) in such a way that the reaction temperature did not exceed 55° C. After the addition was complete, the mixture was stirred for an additional 30 minutes at 55° C., and then cooled to 20° C. The pH of the peroxide-free reaction solution was then adjusted to 7-8 by adding a 50% sodium hydroxide solution. Then the mixture was evaporated to dryness in a rotation evaporator under water jet pump vacuum. 670 g of a greenish brown residue was obtained which was then dissolved in 1500 g of deionized water.

A clear, dark brown solution was obtained having a solid matter content of 30%, a viscosity of 220 mPa.s (20° C.), and a pH of 7-8.

EXAMPLE 6

In this example, copolymer $A_3C_2$ was prepared in an aqueous solution. Solution 1 (containing monomer $A_3$) was prepared by adding 600 g of deionized water and 129 g (1.48 mol) of morpholine (1.48 mol) to a five necked flask, equipped with a KPG-stirrer, a reflux condenser, a dropping funnel, a powder funnel and a thermometer. Then under stirring and within 20 minutes, 142 g (1.45 mol) of maleic anhydride and 116 g of 50% sodium hydroxide solution were simultaneously added in such a way that a pH of the reaction mixture did not exceed 6.5. A temperature of 30° C. was maintained during the reaction by cooling. The mixture was then stirred for an additional 20 minutes after completion of the addition. Afterwards, 425 g of deionized water, 10 g of 50% sulfuric acid, 24 g of 33% hydrogen peroxide and 0.20 g of iron (II)-sulfate-heptahydrate were added in sequence.

Solution 2 (containing the comonomer $C_2$) was prepared in same manner as, and was identical to, Solution 2 of Example 2.

Copolymerization was carried out by adding, drop by drop, Solution 2 to Solution 1 according to the process described in Example 1.

A clear, slightly yellowish solution was obtained having a solid matter content of 30%, a viscosity of 180 mPa.s (20° C.), and a pH of 7-8.

EXAMPLE 7

In this example, copolymer $B_1C_2$ was prepared in an aqueous solution. Solution 1 (containing monomer $B_1$) was prepared by carefully heating a mixture of 800 g (1.46 mol) of polyethylene glycolmonomethyl ether having an average molecular weight of 550, and 142 g (1.45 mol) of maleic anhydride, to 130°-140° C. over 3 hours. After cooling to 30° C. and within 30 minutes, 112 g of 50% sodium hydroxide solution, dissolved in 2180 g of deionized water, was added under vigorous stirring. The temperature was controlled by cooling such that it was maintained below 30° C. After completion of the addition, the mixture was stirred for an additional 15 minutes. Then 10 g of 50% sulfuric acid, 25 g of 33% hydrogen peroxide and 0.20 g of iron (II) sulfate . 7H$_2$O, were added in sequence.

Solution 2 (containing the comonomer $C_2$) was prepared in the same manner as, and was identical to Solution 2 of Example 2.

To effect copolymerization, Solution 2 was added, drop by drop to Solution 1 within 30 minutes in such a way that a reaction temperature of 60° C. was maintained. Stirring was continued at 60° C. until no hydrogen peroxide was detectable. The mixture was then cooled to 20° C., and the pH adjusted to 7-8 by the careful addition of diluted sodium hydroxide solution under vigorous stirring.

A clear, slightly yellowish solution was obtained having a solid matter content of 30% and a viscosity of 310 mPa.s (20° C.).

EXAMPLE 8

Comparative polymer VP1 was prepared by copolymerization of maleic acid with 1-ethenyl-2-pyrrolidinon in a mole ratio of 1:1 in aqueous solution.

A first solution ("Solution 1") was prepared by adding 320 g of deionized water and 225 g of 50% sodium hydroxide solution to a flask, equipped with a KPG-stirrer, a reflux condenser, a dropping funnel and a thermometer. Then under vigorous stirring, 142 g (1.45 mol) of maleic anhydride was added portion by portion. The resulting clear solution was cooled to 20° C., and then 10 g of 50% sulfuric acid, 24 g of 33% hydrogen peroxide and 0.20 g of iron (II) sulfate . $7H_2O$ were added in sequence.

A second solution ("Solution 2"), containing 1-ethenyl-2-pyrrolidinon, was prepared in the same manner described in Example 2.

Solution 2 was then added to Solution 1, drop by drop, under stirring within 15 minutes. By cooling, the temperature was maintained the range of between 50° C. and 55° C. After Solution 2 was added, the mixture was stirred for an additional 20 minutes at 55° C. The solution was then cooled to 20° C. After peroxide residues, which may occasionally be present, were neutralized by adding sodium metabisulfite, the pH was adjusted to 7-8 by careful addition of 50% sodium hydroxide solution.

A clear, slightly yellowish polymer solution was obtained having a solid matter content of 30% and a viscosity of 210 mPa.s (20° C.).

EXAMPLE 9

A second comparative polymer, VP2, was prepared by copolymerization of maleic acid-monosulfanilide (monomer $A_2$, Table 1) with acrylic acid and vinylacetate in a mole ratio of 0.42:1:0.58 in aqueous solution.

A first solution ("Solution 1") was prepared by adding, under stirring, 168 g of deionized water, 34 g of 50% sodium hydroxide solution, and 73 g (0.43 mol) of sulfanilic acid to a one liter flask, equipped with a KPG-stirrer, a thermometer, a reflux condenser, a dropping funnel and a powder funnel.

After cooling the solution to 30° C., 44 g (0.45 mol) of maleic anhydride and 34 g (0.43 mol) of 50% sodium hydroxide solution were added simultaneously within 20 minutes under vigorous stirring in such a way that the initial pH of the reaction mixture (5.5) rose to about 6.7 to 6.9 after the addition was complete, whereby the reaction temperature was maintained in the range of from 30° C. to 35° C. After stirring for an additional 20 minutes, 5 g of 50% sulfuric acid, 6 g of iron (II) sulfate . $7H_2O$ (10% solution), 50 g (0.58 mol) of vinyl acetate in 30 g of isopropanol were added in sequence to the solution.

A second solution ("Solution 2") was prepared by dissolving 72 g (1 mol) of acrylic acid in 80 g of deionized water.

A third solution ("Solution 3") was prepared by mixing 10 g of 33% hydrogen peroxide with 25 g deionized water.

To effect copolymerization, Solution 1 was warmed to 65° C. and Solution 2 and Solution 3 were added drop by drop simultaneously within 50 minutes under reflux and stirring. The reflux temperature rose to 70° C. Then the reaction mixture was maintained for 30 minutes at 70° C., and excess vinyl acetate and isopropanol was exhausted with a vigorous stream of nitrogen. A total of 26 g of distillate was condensed in a cooling trap. Then the reaction mixture was cooled to 20° C. and the pH was adjusted to 6.5 to 7.0 with 80 g of 50% sodium hydroxide solution.

A polymer solution was obtained having a solid matter content of 39.5%, and a viscosity of 210 mPa.s (20° C.).

EXAMPLE 10

A commercially available dispersing agent, SOKOLAN CP10, BASF Germany, based on, a poly-sodium acrylate having molecular weight of 4000, was obtained as comparative polymer VP3.

EXAMPLE 11

A commercially available dispersing agent for hydraulic cement masses, CORMIX 2000, CORMIX, Great Britain, based on an aqueous solution of a copolymerizate of acrylic acid with hydroxypropyl methacrylate, was obtained as comparative polymer VP4.

EXAMPLE 12

A commercially available dispersing agent for hydraulic cement masses, MELMENT-F10, SKW, Germany, based on a sodium salt of a sulfonated melamine-formaldehyde polycondensate, was obtained as comparative polymer VP5.

EXAMPLE 13

A commercially available dispersing agent for hydraulic cement masses, LOMAR-D, Diamond Shamrock, Great Britain, based on a sodium salt of a sulfonated naphthalene-formaldehyde polycondensate, was obtained as comparative polymer VP6.

EXAMPLE 14

This example was conducted to demonstrate the improved dispersing effect of the polymers of the invention. The polymers prepared according to Examples 1-7 were tested in different solid matter suspensions. Those comparative polymers described in Examples 8-13 were also tested and compared in this context.

According to this example, a rotational viscosimetric determination was used to test the dispersing effect of the copolymers. A Brabender viscocorder, Model No., 8018 was used as the viscosimeter.

The solid matter to be dispersed (calcium carbonate and Portland cement) was weighed in a Hobart mixer (vessel volume about 4 liters). Under stirring, a dilute aqueous solution of the additive to be tested was added. Simultaneously, a stop watch was started.

At 10 and 15 minutes after the addition of the solution, the moment of rotation, which is directly proportional to the viscosity of the suspension, was observed from the rotation viscosimeter. The flow effect of a dispersing agent improves as the shear resistance decreases, measured as the moment of rotation, which is exerted by the suspension on the measuring paddle.

| Test Conditions: | |
|---|---|
| $CaCO_3$: | brand Omya red-label |
| Solid matter content: | 70% $CaCO_3$ in water |
| Dosage of the additive: | in % solid polymer, referred to |

-continued

| Test Conditions: | |
|---|---|
| | $CaCO_3$ |
| Shear head: | double anchor paddle |
| Rotation rate: | 120 rpm |

Table 2 summarizes the results which were obtained with the different additives in calcium carbonate slurries having a constant water content. The results demonstrate in an impressive way the surprisingly high dispersing effect of the copolymers of the invention, compared with VP3 (SOKOLAN CP10) which is considered in the art as a good dispersing agent. A relatively bad efficacy is shown by the polycondensates VP5 and VP6, which are mainly used as fluidizers for hydraulic cement masses.

TABLE 2

Dispersing effect of different additives in a $CaCO_3$-slurry.

| Additive | Dosage % solid matter | Shear resistance [g · cm] after 10' | after 15' |
|---|---|---|---|
| without | — | 310 | 330 |
| $A_1C_1$ | 0.02 | 50 | 50 |
| | 0.01 | 220 | 260 |
| $A_1C_2$ | 0.02 | 45 | 50 |
| | 0.01 | 220 | 260 |
| $A_2C_1$ | 0.02 | 35 | 40 |
| | 0.01 | 190 | 240 |
| $A_2C_2$ | 0.02 | 40 | 40 |
| | 0.01 | 210 | 250 |
| VP1 | 0.04 | 30 | 30 |
| | 0.02 | 120 | 120 |
| | 0.01 | 260 | 280 |
| VP2 | 0.04 | 10 | 10 |
| | 0.02 | 140 | 170 |
| | 0.01 | 270 | 300 |
| VP3 | 0.04 | 10 | 20 |
| | 0.02 | 130 | 160 |
| | 0.01 | 265 | 290 |
| VP5 | 0.04 | 30 | 40 |
| | 0.02 | 230 | 260 |
| | 0.01 | 300 | 310 |
| VP6 | 0.04 | 50 | 60 |
| | 0.02 | 200 | 240 |
| | 0.01 | 300 | 320 |

Next, the same additives were tested for their dispersing effect in a cement slurry of constant water content. Table 3 summarizes the results.

| Test Conditions: | |
|---|---|
| Cement: | Portland cement 35 F |
| Water cement value: | W/Z = 0.390 |
| Dosage of the additive: | % by weight of solid polymer, referred to cement |
| Shear head: | cement paddle |
| Rotation rate: | 120 rpm |

The results of this test were quite unexpected in that the polymers according to the invention provided a superior dispersing effect. For example, the results of Table 3 demonstrate that in order to get comparable results (a low shear resistance in the range of from 180 to 210 g.cm), it was necessary to use about twice as much of the comparative additives (0.4%) than those representing the invention.

TABLE 3

Dispersing effect of different additives in a suspension of Portland cement

| Additive | Dosage % solid matter | Shear resistance [g · cm] after 10' | after 15' |
|---|---|---|---|
| without | — | 520 | 500 |
| $A_1C_1$ | 0.2 | 220 | 210 |
| | 0.1 | 260 | 260 |
| $A_1C_2$ | 0.2 | 220 | 220 |
| | 0.1 | 260 | 270 |
| $A_2C_1$ | 0.2 | 195 | 200 |
| | 0.1 | 250 | 250 |
| $A_2C_2$ | 0.2 | 190 | 190 |
| | 0.1 | 250 | 250 |
| VP1 | 0.4 | 190 | 190 |
| | 0.2 | 290 | 290 |
| | 0.1 | 380 | 390 |
| VP2 | 0.4 | 180 | 170 |
| | 0.2 | 280 | 260 |
| | 0.1 | 350 | 350 |
| VP3 | 0.4 | 210 | 220 |
| | 0.2 | 280 | 260 |
| | 0.1 | 360 | 350 |
| VP5 | 0.4 | 210 | 190 |
| | 0.2 | 290 | 290 |
| | 0.1 | 350 | 340 |
| VP6 | 0.4 | 210 | 210 |
| | 0.2 | 250 | 250 |
| | 0.1 | 370 | 380 |

EXAMPLE 15

This example was conducted to demonstrate the improved fluidizing effect of the polymers of the invention. The polymers prepared according to Examples 1-7 were tested as fluidizers in cement mortar and concrete. Those comparative polymers described in Examples 8-13 were also tested and compared in this context.

The consistency of freshly prepared concrete or freshly prepared mortar, i.e., the mobility or viscosity of the freshly prepared mixture, is the most important characteristic of workability. For measuring the consistency of concrete and mortar, a flow table spread is used in industry. Sometimes the "slump test" (setting value) according to ASTM C143 is also used.

For purposes of this experiment the flow table spread was determined by putting concrete into an iron form on a two-part table (70×70 cm). By removing the form, a concrete body having a truncated cone shape is prepared. Then, the area of the table is lifted on one side for 4 cm, and allowed to fall. This procedure is carried out 15 times, and the concrete spreads. The average diameter of the formed cake corresponds to the flow table spread.

In the same way, but with smaller dimensions for the coneform and spread table, the flow table spread of cement mortars can be determined. the cone will have a 70 mm diameter at the top, a 100 mm diameter at the bottom, a height of 60 mm, and a spread table of 300 mm.

For the slump test, three layers of concrete are put into a mold having a shape of a truncated cone and having certain dimensions, and compressed with 25 pushes of an iron bar. At the top, the concrete is stripped off evenly. Then, the form is vertically removed. The concrete body will sink in by itself. The slump is measured by determining the vertical difference between the top of the mold and the displaced original center of the top surface of the test sample. The slump test is not suitable for measuring the consistency of mortar.

In order to compare the obtained test results and to bring them into a relation with the consistency, the freshly prepared concrete or freshly prepared mortar (see DIN 18555, Part 2) may be divided into consistency ranges:

| Consistency Ranges of Freshly Prepared Mortar | |
|---|---|
| Consistency Range | Flow Table Spread (mm) |
| $K_M1$ rigid | <140 |
| $K_M2$ semi-plastic | 140 to 200 |
| $K_M3$ plastic/fluid | >200 |

The consistency range $K_M3$ encompasses not only weak but also flowable mortars showing flow table spreads ≧230 mm as they are used, e.g., in the preparation of self-levelling stone floors.

| Consistency Ranges of Freshly Prepared Concrete | | |
|---|---|---|
| Denotation | Flow Table Spread (cm) | Slump (cm) |
| K1 rigid | <30 | <1 |
| K2 semi-plastic | 30 to 40 | 1 to 9 |
| K3 plastic | 41 to 50 | 10 to 15 |
| K4 fluid | ≧51 | ≧16 |

Fluidizers are used when specific construction applications are necessary. Flow concrete is used when high inserting rates (e.g., from 50 to 100 m³/hour) are required, or when the form and reinforcement of a construction part do not allow a compression of the concrete by vibration due to some technical reason. Concretes having K2 and K3 consistencies may be prepared from a concrete of K1 consistency by adding fluidizers, when increased mechanical strength at an equal remaining workability shall be obtained.

For certain freshly prepared concretes, the effect is dependent on the dosage. Usually, from 0.2 to 1.5% solid matter quantities (in dissolved form), referred to the weight of cement, are added.

To a high degree, the effect is also dependent on the chemical structure of the polymer, which is the basis of the fluidizer.

In order to demonstrate the increased effectiveness of the fluidizers of the invention, the flow behavior of mortar mixtures and concrete mixtures containing the fluidizers described in Examples 1-7 was measured in accordance with DIN 18555, Part 1, and in accordance with DIN 1048, Part 1, and ASTM C143. As a comparison, those polymers described in Examples 8-13 were also tested.

TABLE 4

| Composition of the Test Mortars | |
|---|---|
| Components | Amounts |
| Portland cement 35 F | 1 kg |
| Rhine sand up to 1 mm | 1 kg |
| Rhine sand 1 to 3 mm | 1 kg |
| Rhine sand 3 to 55 mm | 1 kg |
| Mixing water | variable, depending on the water cement value |
| Fluidizer | variable, dissolved in the mixing water |

Cement and sand were premixed in a dry state for 1 minute in a Hobart mixer. Then, with a running stirrer and within 15 to 30 seconds, the mixing water and, occasionally dissolved therein, the fluidizer, were added. The mixture was further mixed for an additional minute on step 1 (about 140 rpm). Then the stirrer was stopped, the mixture was stirred with a ladle, and then mixed for additional 2 minutes on step 1. The flow table spread was then measured.

TABLE 5

| Composition of the Concrete Mixtures | |
|---|---|
| Components | Amount |
| Netstal filler (chalk filler) | 1.5 kg |
| Rhine sand Epple up to 1.2 mm | 9.5 kg |
| Rhine sand Epple 1.2 to 4 mm | 8.0 kg |
| Rhine sand Epple 4 to 8 mm | 4.5 kg |
| Mine gravel * 8 to 16 mm | 11.5 kg |
| Mine gravel * 16 to 32 mm | 15.0 kg |
| Portland cement | 7.5 kg |
| Mixing water | variable, depending on the water cement value |
| Fluidizer | variable, dissolved in the mixing water |

* washed and dried

The cement and the aggregates were premixed for 15 seconds in a 50 liter forced circulation mixer for concrete. Then the mixing water or the fluidizer, distributed in the mixing water, was added slowly under stirring over 15 to 20 seconds. Then the mixture was mixed in a wet state for an additional 60 seconds. A part of the mixture was then immediately filled into the mold for determination of the flow table spread and the slump.

Immediately after measuring the flow table spread, test bodies having edge lengths of 12×12 cm were prepared, and the compressive strength was measured after 1, 7 and 28 days in accordance with DIN 1048, Part 1. The determination of initial setting was carried out in accordance with ASTM C403.

In another test, the copolymers according to the present invention were compared to the comparative copolymers in the context of determining the time dependent decrease of the flow table spread of flow mortars prepared according to the specifications set forth in Table 4.

The dosage was determined in such a way that the mixtures contained certain solid matter amounts of the fluidizer ranging from 4.80 to 1.20%, based on the weight of cement.

The flow table spread was measured immediately after mixing, and remeasured at 15, 30, 45, 60 and 120 minutes after mixing. The results in Table 6 show a surprisingly long lasting constancy of the flow table spread of up to 120 minutes in mixture nos. 2 to 12 containing fluidizers according to the invention. From a comparison of mixture nos. 4 and 9, which both have a fluidizer content of only 1.2%, with mixtures 16 and 17, containing the naphthalene and melamine resin fluidizers in concentrations of 4.8%, it can be seen that the comparative mixtures show a strong stiffening after only 30 minutes despite the fourfold higher fluidizer content.

From a comparison of mixture nos. 13 to 15, which contain the comparative acrylic copolymers of acrylic acid as the fluidizer, with mixture nos. 3, 6, 8, 11 and 12 representing the invention, it can be seen that with the same dosage those fluidizers of the invention can provide a surprisingly high liquefying effect even after 120 minutes.

The time dependent decrease of the flow table spread and of the setting value of flowing concrete was also tested. Mixtures containing fluidizers according to the invention (mixture nos. 2 to 12) were compared to flow concrete mixture nos. 13 to 17 which contain the comparative concrete fluidizer. First, a control concrete without any fluidizer having a water cement value of 0.55 was prepared in accordance with the specifications set forth in Table 5.

The flow table spreads and setting values were measured immediately. The measurement was repeated every 15, 30, 45 etc., up to 180 minutes after mixing. A mixing up of the concrete for 5 seconds was carried out before each new measurement.

Concrete mixture nos. 2 to 17, which were prepared under the same conditions, were then subjected to the above-described examination of flow table spread and slump depending on the time. The test results are summarized in Table 7. From a review of the results it can be seen that the mixtures containing 2.4 to 3.6% of the fluidizer according to the invention maintain their characteristics (according to the definition of a flow concrete) during a full 150 minutes, whereas both mixture nos. 16 and 17 containing the comparative naphthalene- and melamine condensates, lose their flow properties after only 45 minutes. Also, comparative polymer VPI in mixture no. 13 shows a similar stiffening tendency. The comparative copolymerizates based on acrylic acid in mixture nos. 14 and 15, provided flowability for 90 minutes.

The measurements of flow table spread and slump were repeated according to the above with concrete mixtures of W/Z=0.48, which have a far lower water content.

It can be seen from Table 8, particularly mixture nos. 2 to 6, that these measurements confirm the surprising and superior effect of the copolymers according to the present invention.

In addition, Table 9 provides a summary of setting times and time dependent development of the compressive strengths of the mixtures. It can be seen that using fluidizers according to the invention in a concentration of 3.6% retards setting and development of the early strength. At fluidizer concentrations of 2.4% and 1.2% (mixture nos. 3,4 and 6), the retardation of early strength is barely detectable, which is apparent from the high compressive strengths.

In summary, it can be seen that the content of fluidizers according to the present invention may be reduced in construction mixtures to the extent that normal development of strength occurs, without impairing the longtime fluidizing effect, which is required in the practice (see Table 8).

TABLE 6

Time dependent flow table spread of different fluidizers containing mortar mixtures according to DIN 18555.2 at 20° C.

| Mixture No. | Fluidizer denotation | Dosage % o | W/Z | Flow table spread in mm, x minutes after the mixing ||||||||
|---|---|---|---|---|---|---|---|---|---|---|---|
| | | | | X = 0 | 15' | 30' | 45' | 60' | 75' | 90' | 105' | 120' |
| 1 | Without | — | 0.48 | 145 | 145 | 135 | 125 | 115 | 110 | 105 | 100 | 100 |
| 2 | $A_1C_2$* | 3.60 | 0.48 | 290 | 295 | 295 | 297 | 295 | 293 | 290 | 290 | 295 |
| 3 | $A_1C_2$* | 2.40 | 0.48 | 285 | 290 | 290 | 295 | 290 | 275 | 270 | 260 | 240 |
| 4 | $A_1C_2$* | 1.20 | 0.48 | 267 | 250 | 242 | 225 | 202 | 180 | 168 | 160 | 151 |
| 5 | $A_2C_1$* | 3.60 | 0.48 | 298 | 295 | 295 | 290 | 292 | 295 | 291 | 290 | 290 |
| 6 | $A_2C_1$* | 2.40 | 0.48 | 290 | 290 | 291 | 288 | 285 | 283 | 280 | 270 | 255 |
| 7 | $A_2C_2$* | 3.60 | 0.48 | >300 | 295 | 297 | 296 | 296 | 295 | 290 | 290 | 289 |
| 8 | $A_2C_2$* | 2.40 | 0.48 | 295 | 290 | 290 | 291 | 288 | 285 | 285 | 280 | 281 |
| 9 | $A_2C_2$* | 1.20 | 0.48 | 270 | 252 | 240 | 230 | 211 | 195 | 170 | 155 | 149 |
| 10 | $A_2C_3$* | 3.60 | 0.48 | 298 | 295 | 295 | 290 | 290 | 285 | 280 | 280 | 270 |
| 11 | $A_2C_3$* | 2.40 | 0.48 | 290 | 291 | 290 | 287 | 285. | 265 | 250 | 250. | 240 |
| 12 | $A_3C_2$* | 2.40 | 0.48 | 280 | 280 | 275 | 270 | 260 | 260 | 250 | 248 | 220 |
| 13 | VP1 | 2.40 | 0.48 | 290 | 200 | 180 | 150 | 115 | 110 | 110 | 105 | 105 |
| 14 | VP2 | 2.40 | 0.48 | 293 | 260 | 255 | 240 | 215 | 200 | 185 | 180 | 150 |
| 15 | VP4 | 2.40 | 0.48 | 295 | 230 | 230 | 220 | 200 | 185 | 165 | 140 | 130 |
| 16 | VP5 | 4.80 | 0.48 | 285 | 275 | 193 | 165 | 155 | 150 | 140 | 120 | 105 |
| 17 | VP6 | 4.80 | 0.48 | 268 | 206 | 161 | 133 | 125 | 120 | 110 | 100 | 100 |

*Inventive fluidizer according to the production examples 2 to 6.

TABLE 7

Time dependent setting behavior of flow concrete with different fluidizers.
Flow table spread according to DIN 1048.1; setting value (slump) according to ASTM C143. Temperature of measurement 20° C.

| Mixture No. | Fluidizer denotation | Dosage % o | W/Z | Flow table spread in cm, x minutes after the mixing ||||||||
|---|---|---|---|---|---|---|---|---|---|---|---|
| | | | | x = 0' | 15' | 30' | 45' | 60' | 90' | 120' | 150' | 180' |
| 1 | Without | — | 0.55 | 43/10 | 43/10 | 43/6 | 42/5 | 40/4 | 35/4 | 31/1 | — | — |
| 2 | $A_1C_2$* | 3.60 | 0.55 | 63/24 | 62/24 | 60/23 | 61/23 | 60/22 | 60/22 | 60/22 | 56/20 | 51/19 |
| 3 | $A_1C_2$* | 2.40 | 0.55 | 61/24 | 62/23 | 60/22 | 61/22 | 60/21 | 58/21 | 57/20 | 53/19 | 48/17 |
| 4 | $A_1C_2$* | 1.20 | 0.55 | 56/23 | 55/21 | 55/20 | 51/19 | 50/18 | 47/17 | 38/13 | 35/8 | 31/4 |
| 5 | $A_2C_1$* | 3.60 | 0.55 | 61/24 | 60/23 | 60/22 | 60/22 | 58/21 | 57/4 | 55/20 | 50/20 | 50/19 |
| 6 | $A_2C_1$* | 2.40 | 0.55 | 60/22 | 60/22 | 58/23 | 57/22 | 57/21 | 55/20 | 55/20 | 51/19 | 45/16 |
| 7 | $A_2C_2$* | 3.60 | 0.55 | 62/24 | 63/23 | 62/23 | 61/22 | 60/22 | 60/21 | 60/21 | 55/20 | 52/21 |
| 8 | $A_2C_2$* | 2.40 | 0.55 | 60/23 | 61/23 | 60/23 | 60/22 | 60/21 | 59/20 | 58/20 | 54/19 | 51/18 |
| 9 | $A_2C_2$* | 1.20 | 0.55 | 58/22 | 53/22 | 51/21 | 50/21 | 48/19 | 46/17 | 40/15 | 34/10 | 30/5 |
| 10 | $A_2C_3$* | 3.60 | 0.55 | 61/23 | 60/22 | 60/22 | 60/21 | 60/21 | 58/20 | 55/20 | 51/19 | 50/18 |
| 11 | $A_2C_3$* | 2.40 | 0.55 | 61/22 | 60/22 | 60/21 | 58/20 | 56/20 | 55/20 | 51/18 | 50/17 | 45/16 |
| 12 | $A_3C_2$* | 2.40 | 0.55 | 62/23 | 61/22 | 60/22 | 58/21 | 57/21 | 56/20 | 53/18 | 49/16 | 43/15 |
| 13 | VP1 | 2.40 | 0.55 | 58/21 | 52/20 | 50/20 | 50/18 | 45/16 | 40/12 | 35/7 | 31/2 | — |
| 14 | VP2 | 2.40 | 0.55 | 61/24 | 60/23 | 60/22 | 58/22 | 56/21 | 53/20 | 48/18 | 44/15 | 41/12 |
| 15 | VP4 | 2.40 | 0.55 | 62/23 | 60/22 | 60/21 | 58/21 | 57/20 | 55/20 | 47/17 | 40/12 | 32/6 |
| 16 | VP5 | 4.80 | 0.55 | 59/22 | 53/21 | 53/19 | 50/18 | 48/16 | 46/15 | 40/12 | — | — |

TABLE 7-continued

Time dependent setting behavior of flow concrete with different fluidizers. Flow table spread according to DIN 1048.1; setting value (slump) according to ASTM C143. Temperature of measurement 20° C.

| Mixture No. | Fluidizer denotation | Dosage % o | W/Z | Flow table spread in cm, x minutes after the mixing | | | | | | | | |
|---|---|---|---|---|---|---|---|---|---|---|---|---|
| | | | | x = 0' | 15' | 30' | 45' | 60' | 90' | 120' | 150' | 180' |
| 17 | VP6 | 4.80 | 0.55 | 58/21 | 51/20 | 50/15 | 45/10 | 40/7 | 37/3 | 33/1 | — | — |

*Inventive fluidizer according to the production examples 2 to 6.

TABLE 8

Time dependent setting behavior of concrete of W/Z = 0.48 with different fluidizers. Flow table spread according to DIN 1048.1; setting value (slump) according to ASTM C143. Temperature of measurement 20° C.

| Mixture No. | Fluidizer denotation | Dosage % o | W/Z | Flow table spread in cm, x minutes after the mixing | | | | | | | | |
|---|---|---|---|---|---|---|---|---|---|---|---|---|
| | | | | x = 0 | 15' | 30' | 45' | 60' | 90' | 105' | 120' | 135' |
| 1 | O | — | 0.48 | 32/3 | 31/3 | 30/2 | 30/1 | — | — | — | — | — |
| 2 | $A_2C_2$* | 3.60 | 0.48 | 60/22 | 60/21 | 59/22 | 59/22 | 59/2 | 53/21 | 52/20 | 50/19 | 42/12 |
| 3 | $A_2C_2$* | 2.40 | 0.48 | 60/22 | 59/21 | 59/20 | 58/20 | 50/20 | 50/20 | 50/20 | 47/15 | 42/10 |
| 4 | $A_2C_2$* | 1.20 | 0.48 | 55/18 | 50/15 | 48/15 | 43/11 | 40/10 | 38/10 | 33/8 | — | — |
| 5 | $B_1C_2$* | 3.60 | 0.48 | 58/20 | 56/20 | 55/20 | 52/20 | 50/19 | 47/15 | 35/10 | — | — |
| 6 | $B_1C_2$* | 2.40 | 0.48 | 49/16 | 44/16 | 39/8 | 39/4 | 39/4 | 36/2 | 30/1 | — | — |
| 7 | VP2 | 2.40 | 0.48 | 56/20 | 48/16 | 44/16 | 44/7 | 38/5 | 35/3 | 30/1 | — | — |
| 8 | VP4 | 2.40 | 0.48 | 54/19 | 42/12 | 42/12 | 39/4 | 37/3 | 33/2 | 30/2 | — | — |
| 9 | VP5 | 4.80 | 0.48 | 61/20 | 55/18 | 51/15 | 42/11 | 39/10 | 37/9 | 33/4 | — | — |
| 10 | VP6 | 4.80 | 0.48 | 56/21 | 51/16 | 43/10 | 38/6 | 33/3 | 31/1 | — | — | — |

*Inventive fluidizer according to the production examples 4 and 7.

TABLE 9

Beginning of setting according to ASTM C403. Flow table spread and compressive strength according to DIN 1048.1 of fluidizer containing concrete mixtures.

| | Mixture No. | | | | | | | | | |
|---|---|---|---|---|---|---|---|---|---|---|
| | 1 | 2 | 3 | 4 | 5 | 6 | 7 | 8 | 9 | 10 |
| Fluidizer denotation | 0 | $A_2C_2$* | $A_2C_2$* | $A_2C_2$* | $B_1C_2$* | $B_1C_2$* | VP2 | VP4 | VP5 | VP6 |
| Dosage (% o) | — | 3.6 | 2.4 | 1.2 | 3.6 | 2.4 | 2.4 | 2.4 | 4.8 | 4.8 |
| W/Z | 0.48 | 0.48 | 0.48 | 0.48 | 0.48 | 0.48 | 0.48 | 0.48 | 0.48 | 0.48 |
| Beginning of setting, in hours after mixing | 2.75 | 10.0 | 7.0 | 4.0 | 7.5 | 4.0 | 5.5 | 8 | 3.75 | 3 |
| Flow table spread in cm | 32 | 60 | 60 | 55 | 58 | 49 | 56 | 54 | 61 | 56 |
| Compressive strength (N/mm²) after | | | | | | | | | | |
| 1 day | 20.3 | 14.9 | 21.4 | 22.2 | 18.5 | 21.4 | 21.7 | 22.9 | 24.1 | 24.3 |
| 7 days | 39.7 | 32.8 | 41.3 | 37.3 | 37.7 | 40.8 | 36.4 | 37.0 | 40 | 42.5 |
| 28 days | 43.7 | 39.7 | 46.5 | 44 | 46.0 | 45.2 | 41.2 | 45.1 | 47.4 | 47.8 |

*Inventive fluidizer according to the production examples 4 and 7.

The foregoing description of the invention in primary part portrays particular preferred embodiments in accordance with the requirements of the patent statutes and for purposes of explanation and illustration. It will be apparent, however, to those skilled in the art, that many modifications and changes may be made without departing from the spirit and scope of the invention. It is applicants' intention to cover such modifications and variations in the following claims.

What is claimed is:

1. A fluidizer for suspensions of solid matter, said fluidizer being a water soluble linear copolymer comprising:

r partial structure units of formula (C)

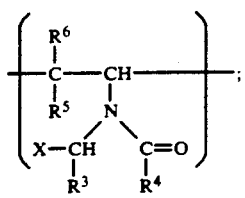

(C)

wherein r is an integer and ranges from 3 to 1000, p partial structure units of formula (A)

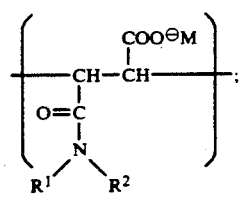

(A)

wherein p is an integer and ranges from 0 to 1000, and q partial structure units of formula (B)

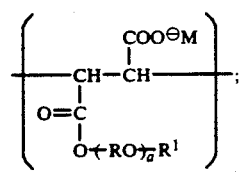

(B)

wherein q is an integer and ranges from 0 to 1000, with the proviso that the sum of p+q is in the range of $3 \leq p+q \leq r$, and wherein $R^1$ and $R^2$, which may be the same or different, each represent hydrogen, a $C_1$- to $C_{20}$-alkyl residue which may include one or more alkali metal carboxylate or alkaline earth metal carboxylate groups, at least one of which is in the position $\alpha$ to the nitrogen atom, an aromatic group, an aliphatic or cyclo-aliphatic residue either of which may include sulfonic acid groups or alkali metal or alkaline earth metal sulfonate groups, a hydroxyalkyl group, or may together with the nitrogen atom to which they are bound form a morpholine ring;

M represents a hydrogen ion, a monovalent or divalent metal ion or a substituted ammonium group;

R represents an alkylene group having 2 to 4 carbon atoms;

R' represents a hydrogen atom or an alkyl group having 1 to 4 carbon atoms;

a represents an integer ranging from 1 to 100;

$R^3$ and $R^4$, which may be the same or different, each represent hydrogen, a $C_1$ to $C_{12}$-alkyl residue, a phenyl residue, or may together form a di-, tri-, or tetramethylene group, which form with the inclusion of the residue of the formula:

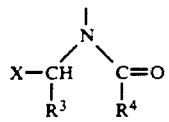

a five, six or seven membered ring;

$R^5$ and $R^6$, which may be the same or different, each represent hydrogen, a $C_1$ to $C_{12}$-alkyl residue or a phenyl residue; and X represents hydrogen, a $C_1$- to $C_4$-alkyl residue, a carboxylic acid group or a alkali metal carboxylate group.

2. A fluidizer for suspensions of solid matter according to claim 1, wherein $q=0$ and $p \leq r$, and wherein 3 to 1000 structure units represented by Formula (A) and an equal number of structure units represented by Formula (C) are bound in an alternating manner to each other.

3. A fluidizer for suspensions of solid matter according to claim 1, wherein $R^1$ is hydrogen and $R^2$ is represented by the formula:

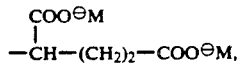

4. A fluidizer for suspensions of solid matter according to claim 3, wherein the structure units represented by Formula (A) are represented by Formula (AI); and the structure units represented by Formula (C) are represented by Formula (CI); wherein $R^5$ and $R^6$, which may be the same or different, each represent a hydrogen or a methyl group.

5. A fluidizer for suspensions of solid matter according to claim 4, wherein $q=0$ and $P \leq r$, and wherein 3 to 1000 structure units represented by Formula (AI) and an equal number of structure units represented by Formula (CI) are bound in an alternating manner to each other.

6. A fluidizer for suspensions of solid matter according to claim 3, wherein the structure units represented by Formula (A) are represented by Formula (AI); and the structure units represented by Formula (C) are represented by Formula (CII); wherein $R^5$ and $R^6$ which may be the same or different each represent a hydrogen or a methyl group.

7. A fluidizer for suspensions of solid matter according to claim 6, wherein $q=0$ and $p \leq r$, and wherein 3 to 1000 structure units represented by Formula (AI) and an equal number of structure units represented by Formula (CII) are bound in an alternating manner to each other.

8. A fluidizer for suspensions of solid matter according to claim 1, wherein $R^1$ is hydrogen and $R^2$ is represented by the formula:

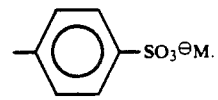

9. A fluidizer for suspensions of solid matter according to claim 8, wherein the structure units represented by Formula (A) are represented by Formula (AII); and the structure units represented by Formula (C) are represented by Formula (CI); wherein $R^5$ and $R^6$ which may be the same or different each represent a hydrogen or a methyl group.

10. A fluidizer for suspensions of solid matter according to 8, wherein the structure units represented by Formula (A) are represented by Formula (AII); and the structure units represented by Formula (C) are represented by Formula (CII); wherein $R^5$ and $R^6$ which may be the same or different each represent a hydrogen or a methyl group.

11. A fluidizer for suspensions of solid matter according to claim 10, wherein $q=0$ and $p \leq r$, and wherein 3 to 1000 structure units represented by Formula (AII) and an equal number of structure units represented by Formula (CII) are bound in an alternating manner to each other.

12. A fluidizer for suspensions of solid matter according to claim 9, wherein the structure units represented by Formula (A) are represented by Formula (AII); and the structure units represented by Formula (C) are represented by Formula (CIII); wherein $R^5$ and $R^6$ which may be the same or different each represent a hydrogen or a methyl group.

13. A fluidizer for suspensions of solid matter according to claim 12, wherein $q=0$ and $p \leq r$, and wherein 3 to 1000 structure units represented by Formula (AII) and an equal number of structure units represented by Formula (CIII) are bound in an alternating manner to each other.

14. A fluidizer for suspensions of solid matter according to claim 1, wherein the structure units represented by Formula (A) are represented by Formula (AIII); and the structure units represented by Formula (C) are represented by Formula (CII); wherein $R^5$ and $R^6$ which may be the same or different each represent a hydrogen or a methyl group.

15. A fluidizer for suspensions of solid matter according to claim 4, wherein $q=0$ and $p \leq r$, and wherein 3 to 1000 structure units represented by Formula (AII) and an equal number of structure units represented by Formula (CII) are bound in an alternating manner to each other.

16. A process for the preparation of copolymers according to claim 1, comprising the radical copolymerization of (i) 0 to 60 mol % of a monomer represented by formula (1):

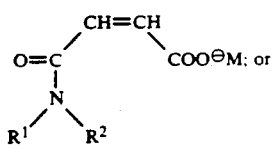

(ii) 0 to 60 mol % of a monomer represented by formula (2):

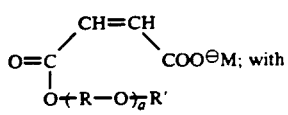

(iii) 40 to 60 mol % of a monomer represented by formula (3):

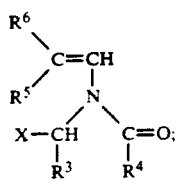

wherein the total of (i) to (iii) must give 100 mol %, in a solvent and using at least one polymerization catalyst and at least one chain length controlling agent, at temperatures from 5 to 100° C.

17. A process according to claim 11, wherein the temperature range from 10° C. to 75° C.

18. A process according to claim 16, wherein 50 mol % of a monomer represented by formula (1) is reacted with 50 mol % of a monomer represented by formula (3).

19. A process according to claim 16, wherein sodium salts of monomers of general formula (1) are used.

20. A process according to claim 16, wherein the solvent contains at least one of water and an alcohol.

21. A process according to claim 20, wherein the solvent contains isopropanol.

22. A process according to claim 16, wherein the catalyst is selected from at least one of hydrogen peroxide and sodium peroxide.

23. A process according to claim 16, wherein the reaction is carried out at a pH 1 from about 4.5 to about 7.0.

24. A process according to claim 16, wherein the reaction is carried out in an open atmosphere.

25. An aqueous solution of the copolymer set forth in claim 1.

26. The aqueous solution according to claim 25, said aqueous solution containing the copolymer in an amount ranging from 0.01 to 60% by weight.

27. The aqueous solution according to claim 26, wherein the copolymer is present in an amount ranging from 0.01 to 5% by weight.

28. A fluidizer according to claim 3, further comprising at least one chain ending structure unit represented by Formula (C) at one or both ends of the chain.

29. A fluidizer according to claim 6, further comprising at least one chain ending structure unit represented by Formula (CI) at one or both ends of the chain.

30. A fluidizer according to claim 8, further comprising at least one chain ending structure unit represented by Formula (CII) at one or both ends of the chain.

31. A fluidizer according to claim 12, further comprising at least one chain ending structure unit represented by Formula (CII) at one or both ends of the chain.

32. A fluidizer according to claim 14, further comprising at least one chain ending structure unit represented by Formula (CIII) at one or both ends of the chain.

33. A fluidizier according to claim 16, further comprising at least one chain ending structure unit represented by Formula (CII) at one or both ends of the chain.

* * * * *